United States Patent Office 3,037,854
Patented June 5, 1962

3,037,854
HERBICIDAL COMPOSITIONS ADAPTABLE TO BE DISPENSED FROM A PRESSURE TIGHT CONTAINER
Edward Joseph Kenney, Caldwell, and Peter T. Vitale, Clifton, N.J., assignors to Colgate-Palmolive Company, New York, N.Y., a corporation of Delaware
No Drawing. Filed Aug. 1, 1958, Ser. No. 752,439
8 Claims. (Cl. 71—2.6)

The present invention relates to a pressurized herbicidal composition in a pressure-resistant container comprising a herbicidal agent, a propellant, and a soluble organic compound which leaves an identifying mark upon application to the plants, as hereinafter described and claimed.

Within recent years, herbicidal compositions comprising a herbicidal agent (plant growth regulant) and a propellant in a pressure-resistant container, commonly referred to as an aerosol dispenser, have been proposed in the art. In essence, the material is propelled or discharged from the container in the form of a fine mist or spray and the gaseous propellant which serves as the principal propelling force is quickly dissipated to the surrounding atmosphere upon application of the herbicidal composition to the plant.

After spraying a portion of the lawn or the like with a herbicidal composition, it is difficult to determine which weeds have been sprayed and which plants have not received an application of the herbicide. The presence of an indicator or a marker in the composition which would indicate the area of application of the herbicide, or the amount applied to the weeds and the like, should prove to be economical in use and convenient to the consumer. The addition of a pigment marker such as titanium dioxide in a pressurized herbicidal composition has been found to possess certain significant disadvantages since it does not dissolve in the propellant system but rather exists in the form of a dispersion and/or precipitate. The presence of a pigment in the composition may result in the clogging of the valve, the spout, and other parts of relatively small diameter by the insoluble pigment particles. In addition, it is necessary to agitate or shake well the pigment-containing composition before use in order to disperse any precipitated pigment.

The present invention relates to a herbicidal composition in a pressure-tight container provided with a normally closed valve-controlled outlet, which comprises a minor proportion of a herbicidal agent, a propellant, and a minor proportion of an organic compound dissolved in a solvent medium, said organic compound being normally solid at 40° C. and preferably at 50° C. and which solidifies or crystallizes to a visible film upon evaporation of the solvent medium immediately after application to the plant life. By the term "visible film," it is intended to mean an opaque whitish film or any similar colored film or coating which is discernable to the eye against the background of the plant. Depending upon the particular composition, there may be incorporated auxiliary solvents or vapor pressure depressants so as to insure solubility of the organic compound.

More particularly, the preferred composition comprises about ¼ to 10% by weight of an organic herbicide such as a phenoxyacetic acid herbicidal compound, e.g. phenoxyacetic acid esters and salts; about 5 to 95%, preferably 10 to 50%, by weight of a liquefied normally gaseous organic propellant solvent which is preferably a liquefied normally gaseous halogenated hydrocarbon, about ½ to 10% by weight of a normally solid organic compound, such as the normally solid higher fatty acid material which is normally solid at 50° C., and a volatile co-solvent in an amount from about 5 to 95% by weight, said ingredients forming a homogeneous liquid phase containing said herbicidal compound and fatty acid material dissolved in said solvents, said fatty acid material solidifying to a visible solid film upon application of the herbicidal composition in the form of a spray to the plant.

The herbicidal compositions of the present invention have a number of significant advantages. The composition contains an effective herbicidal agent which permits simultaneous adsorption or absorption of the herbicidal ingredient by the plant with simultaneous precipitation of the solid marking film as a surface phenomenon. The composition in the container is in the form of a homogeneous solution and eliminates the necessity for the shaking of the can before use and any possible clogging of the valves. The ingredients are so compatible that the system is capable of considerable variation so as to produce a relatively coarse or fine spray as desired with the appearance of the marker on the plant in a reasonably short time, such as within about two minutes, so that the user may see the whitened or otherwise visibly colored weeds quickly.

The present invention permits the formulation of herbicidal compositions having a predetermined ratio of the marker to the herbicidal ingredient using a particular solvent propellant medium so that the consumer can gauge the amount of material to be applied to the plant. As a consequence, the consumer will be able to apply sufficient herbicide to kill the weed when the application results in the deposition of an even, light coating of the marker on the plant.

The herbicidal agent should be compatible with the marking material and soluble in the solvent-propellant system. The terms "soluble," "dissolved," or equivalent wording with respect to the herbicide and the marker in the solvent medium are used in the broad sense as indicating the formation of an apparent solution as determined by ordinary visual examination at room temperature in a pressurized glass container. The herbicides are usually plant growth regulants which are employed particularly for destroying such plants as weels. The term "weed" is used in its broad sense as indicative of a plant which grows in undesired locations.

In general, the herbicidal agent is an organic compound. It is preferred to employ a phenoxyacetic acid herbicidal compound, e.g. halogenated phenoxyacetic esters, salts, amides, etc. Such herbicides are known and are utilized usually in the form of the esters or salts. The esters of the chlorinated phenoxyacetic acids are particularly effective, such as the aliphatic esters of 2,4-dichlorophenoxyacetic acid (2,4-D) and 2,4,5-trichlorophenoxyacetic acid (2,4,5-T). Suitable examples are the alkyl esters such as the iso-octyl (2-ethyl hexyl) and isopropyl esters of 2,4-dichlorophenoxyacetic acid, and the alkylene glycol or alkoxyalkyl esters such as the polyethylene glycol or butoxyethoxypropyl esters of 2,4-dichlorophenoxyacetic acid. The corresponding esters of 2,4,5-trichlorophenoxyacetic acid may be employed also, further examples being the butyl and iso-octyl esters. Various blends of the "2,4-D" esters and "2,4,5-T" esters, e.g. ratio of 1:1 to 1:2 respectively, may be employed as desired. The water-soluble salts of the "2,4-D" and "2,4,5-T" acids may be employed also, such as the amine salts (e.g. morpholine salt) of these acids.

Other known organic herbicidal agents can be used such as 3-(p-chlorophenyl)-1,1-dimethylurea trichloroacetate; 1-n-butyl-3(3,4-dichlorophenyl)-1-methyl urea; the carbamates, e.g. isopropyl-N-(3-chlorophenyl) carbamate and iso-propyl-N-phenyl-carbamate; the dinitros, e.g. sodium salt of 4,6-dinitro-o-secamylphenol; 2-methyl-4-chlorophenoxyacetic acid and the same salts and esters described with the "2,4-D" and "2,4,5-T" acid compounds above; disodium monomethyl arsonate; and the like. The specific herbicide will be properly selected depending upon the type of herbicidal activity desired and will be integrated with the other ingredients so that it is compatible with the particular marker and the desired propellant solvent system to provide a product having the desired propellant solvent system to provide a product having the desired characteristics in accordance with the instant invention.

The propellant is preferably a liquefied normally gaseous substance (including mixtures thereof). In general, the selection of the particular propellant should be integrated with the type of container and the particular vapor pressure desired. It is preferred to use the liquefied normally gaseous low molecular weight halogenated hydrocarbon propellants, such as halogenated ethane, methane and mixtures thereof. The halogenated hydrocarbons known in the art as the "Freons" and "Genetrons" and the like have been found to be particularly suitable. Specific examples of such propellants are dichloro difluoro methane (Freon 12), dichloro tetrafluoro ethane, monochloro-difluoro ethane, trichloro-monofluoro methane (Freon 11), and mixtures thereof, etc.

Other materials which may be used as part of the propellant system are methylene chloride and methyl chloroform which act as auxiliary solvents and vapor pressure depressants in order to adjust the pressure. Various gaseous hydrocarbon propellants may be employed in a liquefied state also, such as the aliphatic hydrocarbons having three to four carbons (e.g. propane, butane, isobutane, and mixtures thereof). These liquefied normally gaseous propellants form the solvent medium, at least in part, for the organic herbicidal and marking materials.

Other propellants which are non-liquefied but in the gaseous state in the container may be employed also in the pressurized composition. These gaseous propellants are compressed to the desired pressure, examples being compressed inorganic gases such as nitrogen, argon, compressed air, carbon dioxide, nitrous oxide, and mixtures thereof. The use of these gaseous propellants results in a gaseous propellant phase in contact with a liquid solvent medium containing the herbicide and marker. Any suitable volatile liquid solvent may be used, such as the auxiliary or co-solvent materials described herein, e.g. ethanol.

The marker employed in the present invention should have particular characteristics. It is an organic compound which is normally solid at 40° C. and preferably at about 50° C. and soluble in the liquid (including liquefied) solvent medium. The melting point or titer of the marking material is important since it should be a visible solid material on the plant even during hot weather. Such marker should be stable and non-reactive with the other ingredients in the system and capable of immediate solidification or crystallization upon the vaporization of the propellant solvent system when the composition is ejected from the pressure container. It should solidify to a visible film upon the green plant life within a relatively short period of time of the order of less than 15 minutes, usually within five minutes, and preferably up to about one or two minutes. The marking material disappears eventually from the plant since it is either washed away or blown away in the form of dust usually. It is preferred to employ the higher fatty acid material having at least 12 and preferably 14 carbon atoms in the fatty acyl radical. Among the higher fatty acid materials are the suitable higher fatty acids (including solid mixtures thereof), higher fatty acid esters with lower aliphatic alcohols such as the glyceride esters, etc. Examples of the suitable higher fatty acids are lauric acid, myristic acid, palmitic acid, stearic acid, 12-hydroxystearic acid, behenic acid, etc. Suitable fatty acid esters are hydrogenated lard (e.g. lard flakes) and similar animal and vegetable fats. Various cellulose compounds may be employed also, such as the lower alkyl ethers of cellulose, e.g. ethyl cellulose. It has been found that optimum effects are obtained usually with the use of fatty acid materials having 16–18 carbons in the fatty acyl radical such as stearic acid.

The proportions of these ingredients are variable depending upon the specific effects desired and the character of the specific ingredients, such as the wetness of the spray, the degree and sharpness of marking, the type and amount of herbicide and marking ingredient, etc. In order to produce the desired results upon the plant, the concentration of the herbicidal agent should be sufficient to be effective against the undesired plant life and the concentration of the marker should be sufficient to result in the desired speed and degree of marking automatically upon application of a reasonable quantity of the composition to the plant life. These effects can be obtained by proper formulation of the composition. In general, the amount of herbicidal agent will be a minor proportion (less than 50%), and preferably about ¼% to about 10%, and the amount of the marker will be a minor proportion also, and preferably about ¼% to about 10% by weight of the composition in the container, the balance being primarily volatiles and propellants. The amount of propellant will be determined by the desired vapor pressure and the type of spray desired. The proportion of liquefied propellant will be usually from about 5% to 95%, preferably about 20% to 70% by weight.

It is an embodiment of the present invention to incorporate in the product a solvent material to insure solubility of the herbicidal ingredient and the marker, formation of the herbicidal composition broadly as a single liquid phase, and to modify the vapor pressure if desired. Since the liquefied gaseous propellants exert a solvent action also, these auxiliary materials are denoted as co-solvent materials herein. The term "co-solvent" has reference to a material performing any of the above functions. It is possible to formulate the herbicidal composition without the co-solvent but its inclusion is advantageous since it insures the obtention of the desired characteristics and permits wide variation in formulation.

In general, the co-solvents are volatile, fast-drying, normally-liquid compounds which preferably have an absolute vapor pressure at 10° C. of at least about 10 millimeters of mercury. The co-solvents may be suitably selected from a variety of known solvents including aliphatic alcohols, ketones, esters, halogenated hydrocarbons, and the like. Suitable co-solvent materials are the lower aliphatic monohydric alcohols such as ethyl alcohol and isopropyl alcohol. The presence of ethanol is preferred since it exerts significant effects as a solvent and upon the spray characteristics. Other materials such as acetone and the like may be empolyed also. Co-solvent materials which are particularly useful as vapor-pressure regulators or depressants to adjust the pressure in the container and for solvent action are liquid halogenated hydrocarbons such as methylene chloride and methyl chloroform. It is preferred to employ a mixture of the liquid alcohol and halogenated hydrocarbon.

Such co-solvent material is used usually in amounts from about 5 to 95% by weight, preferably about 10 to 75% by weight. In addition to acting as a co-solvent for both the marker and the herbicide, a further advantage is that the proportion of solvent such as alcohol in the product may be used as a partial control of the degree of spray wetness in the product. This characteristic permits for better operational control of the spray and minimizes vapor drift of herbicide upon application to the plant material. The proportion of alcohol should not be sufficient to unduly prolong the period in which the marker becomes visible upon the plant after application thereto since the marking effect is contingent upon the rapid evaporation of the solvent medium.

The pressurized composition comprises a pressure-resistant container having a normally closed valve-controlled outlet using a suitable valve assembly. The container is a metallic can usually, but other types of containers may be employed including glass and plastic containers with appropriate modifications.

The can is sealed by a cup or cover on which is supported a discharge valve which, when operated, will permit the contents to flow to a spout. The valve may be of metallic or plastic structure having any desired orifice size. It is preferred to employ a dip tube such as a flexible plastic tube extending to the bottom of the can and near the side wall thereof, and secured at its upper end to the valve. With the use of a dip tube, the contents can be discharged from the can in its normal vertical, or almost vertical position. If a container is designed to be held in an inverted position, a valve assembly without a dip tube may be used satisfactorily. An acceptable pressurized composition can be designed and produced with a variety of valves having discharge orifices with varying discharge areas and with various dimensions of the dip tubes and spouts.

These pressurized compositions in the container may be prepared in any suitable manner. One method of filling the aerosol cans is by the known pressure filling method wherein the ingredients other than the propellent are added to the pressure container which is subsequently sealed. Thereafter, the propellant under pressure is introduced into the container through the valve or by other appropriate means. If desired, the container may be chilled slightly during this operation. Another procedure is a cold-filling operation, wherein the stearic acid and herbicide are added in any suitable form to the aerosol container followed by addition of the propellant-solvent system at low temperatures such as from about 0 to minus 40° F.

The type and amount of propellant determines the pressure in the container. Any suitable pressure sufficient to propel the contents may be employed. The Interstate Commerce Commission has prescribed a maximum pressure for various types of propellants and containers for products moving in interstate commerce unless a special permit is obtained. With products containing the liquefied propellants, it is preferred to have a maximum pressure of about 40 pounds per square inch guage (p.s.i.g.) at 70° F. whereas, higher pressures are used ordinarily with the compressible non-liquefied gases.

It has been found that the most effective method of incorporating the marker is to add it to the container in solid form, e.g. a pellet of any desired size or shape, provided that it is sufficiently large so that it cannot clog the valve structure. The pellet starts to dissolve immediately, and is completely dissolved in the solvent medium within several hours. This processing technique has a number of distinct advantages. The procedure allows the pellet, due to its usually comparative low density, to float in the finished formulation above the dip tube level in the container during the filling procedure. In this way, the chance for any undissolved fatty acid material or other marking material to lodge in the dip tube and possibly clog the valve is reduced to a minimum. An alternative method of incorporating the marker would be to dissolve it in the solvent or propellant initially, but such technique would not be preferred in the event of severe chilling in the cold-filling procedure since there would be a tendency for the marker to precipitate from the solution.

The finished composition is applied to the undesired plant life in a form of a mist or spray. The most advantageous procedure is to spray the composition directly on the leaves of the plants to be exterminated since this method permits the ready adsorption of the herbicidal agent and forms a base for deposition of a smooth, even coating of the marker. In general, the effectiveness of the herbicide and the sharpness of the marker will be at an optimum when the composition is applied on a sunny day, preferably having a temperature of at least about 70° F. In this way the marking film will become visible within a matter of seconds after its application to the plant and it will form a guide as to the sufficiency of application of the material.

The following specific examples are further illustrative of the nature of the present invention and it is to understood that the invention is not limited thereto. All parts are by weight unless otherwise specified.

Examples I–IV

The following formulations produced effective herbicidal compositions:

| Ingredients | Composition | | | |
|---|---|---|---|---|
| | I | II | III | IV |
| | Percent | Percent | Percent | Percent |
| Marking material | 2.0A | 6.0A | 3.0B | 4.0B |
| Herbicide | 1.8C | 1.8C | 1.8C | 2.3D |
| Anhydrous Ethanol | 33.1 | 33.2 | 32.2 | 30.0 |
| Methylene Chloride | | | | 35.35 |
| Freon-11 | 34.65 | 32.45 | 34.65 | 8.35 |
| Freon-12 | 28.45 | 26.55 | 28.35 | 20.00 |

Code:
 A. 12-Hydroxystearic acid
 B. 94% stearic acid-6% palmitic acid.
 C. Iso-octyl (2-ethylhexyl) ester of 2,4-dichlorophenoxyacetic acid.
 D. Butoxyethoxypropyl ester of 2,4-dichlorophenoxyacetic acid.

These formulas were prepared in the preferred manner by adding the stearic acid in the form of a pellet of approximately 13–14 grams into an open metallic container having about a 12 ounce capacity. The balance of the ingredients of each formula except the propellant gases were mixed together and pre-cooled to a temperature of about −40° F. and added to the container, followed by addition of the propellant gases in liquefied form. A valve assembly including the normally closed valve and dip tube is inserted, and the container is sealed. After the product has been permitted to warm to room temperature, it has a pressure of about 35 p.s.i.g. at 70° F. and it is ready to be dispensed through the manually operated valve.

The above compositions have been found to be effective herbicidal materials having a single liquid phase in the container and which dry to a smooth, even white marking film upon the sprayed plants within a few minutes, usually about 30 to 120 seconds, on a warm day. The products containing stearic acid as the marker in Examples III and IV are superior in marking to products I and II containing the hydroxy stearic acid.

Example V

The formulation of Examples IV is repeated with the substitution of an equivalent amount of a 19:1 mixture of stearic acid and paraffin as the marking material for the mixture of stearic and palmitic acids. This formulation proves to be highly satisfactory in use also.

Example VI

The formulation of Example III is repeated with the exception that ethyl cellulose in powder form is substituted for the mixture of stearic and palmitic acids as the marking material. This formulation is effective also but is inferior to the effects obtained with the composition of Example III.

Example VII

| Ingredient: | Percent |
|---|---|
| Commercial stearic acid | 4.0 |
| 2,4-D acid | 2.2 |
| Morpholine | .9 |
| Anhydrous ethanol | 31.2 |
| Methylene chloride | 33.35 |
| Freon 11 | 8.35 |
| Freon 12 | 20.00 |
| | 100.00 |

2,4-D acid: 2,4-dichlorophenoxyacetic acid.

In the above composition, the morpholine reacts with the 2,4-D acid to form the morpholine salt thereof which is the active herbicidal agent. The composition is prepared in the same manner and, upon application to the plants, it deposits a white marking film quickly.

*Example VIII*

The formulation of Example VII is repeated with the exception that lard flakes are substituted for the stearic acid as the marking material with equivalent results.

Although the present invention has been described with reference to particular embodiments and examples, it will be apparent to those skilled in the art that variations and modifications of this invention can be made and that equivalents can be substituted therefor without departing from the principles and true spirit of the invention.

Having thus described the invention, what is claimed is:

1. A herbicidal composition adapted to be dispensed from a pressure-tight container having a normally closed valve-controlled outlet and having therein about ¼ to 10% by weight of a phenoxyacetic acid herbicide, about 5 to 95% by weight of a liquefied normally gaseous halogenated hydrocarbon propellant solvent, about ½ to 10% by weight of a higher fatty acid having 16 to 18 carbons which is normally solid at 50° C., and about 5 to 95% by weight of a volatile co-solvent selected from the group consisting of ethanol, isopropyl alcohol, acetone, methylenechloride and methylchloroform, said ingredients forming a homogeneous liquid phase containing said herbicide and fatty acid dissolved in the solvent medium, said fatty acid solidifying to a visible solid film upon application of the herbicide to the plant.

2. A pressurized herbicide in accordance with claim 1 which contains an aliphatic ester of 2,4-dichlorophenoxyacetic acid.

3. A pressurized herbicidal composition in accordance with claim 1 which contains an ester of 2,4,5-trichlorophenoxyacetic acid.

4. A herbicidal composition adapted to be dispensed from a pressure-tight container having a normally-closed valve-controlled outlet and having therein about ¼ to 10% by weight of a herbicide selected from the group consisting of butoxyethoxypropyl ester of 2,4-dichlorophenoxyacetic acid, isooctyl ester of 2,4-dichlorophenoxyacetic acid and morpholine salt of 2,4-dichlorophenoxyacetic acid, and about 20 to 70% by weight of a propellant comprising a liquefied normally gaseous halogenated hydrocarbon selected from the group consisting of dichloro difluoro methane and trichloro monofluoro methane, about 10 to 75% by weight of ethanol, and about ½ to 10% by weight of a higher fatty acid material which is normally solid at 50° C. and comprises stearic acid, said ingredients forming a homogeneous liquid phase containing said herbicide and fatty acid material dissolved in the solvent medium, said fatty acid material solidifying quickly to a visible solid film upon application of the herbicide to the plant.

5. A herbicidal composition adapted to be dispensed from a pressure-tight container having a normally-closed valve-controlled outlet which comprises a homogeneous liquid phase having dissolved therein about ¼ to 10% by weight of an aryloxyacetic acid herbicidal compound and about ¼ to 10% by weight of an organic marking compound which is normally solid at 40° C. and selected from the group consisting of higher fatty acids having 12 to 22 carbon atoms, higher fatty acid esters of lower aliphatic alcohols having 12 to 22 carbon atoms in the fatty acid radical, and lower alkyl ethers of cellulose, about 5 to 95% by weight of a volatile co-solvent selected from the group consisting of ethanol, isopropyl alcohol, acetone, methylene chloride and methyl chloroform and about 5 to 95% by weight of a propellant selected from the group consisting of liquefied normally gaseous hydrocarbon and halogenated hydrocarbon propellants for dispensing said herbicidal composition from the pressure-tight container, said organic marking compound solidifying quickly to a visible solid film upon application of the herbicide to the plant.

6. A herbicidal composition in accordance with claim 5 wherein said marking compound is stearic acid.

7. A herbicidal composition in accordance with claim 5 wherein said marking compound is lard flakes.

8. A method for treating weeds and the like which comprises applying to the weeds a spray resulting from the release to the atmosphere of a herbicidal composition in a pressure-tight container containing about 5 to 95% by weight of a propellant selected from the group consisting of liquefied normally gaseous hydrocarbon and halogenated hydrocarbon propellants for dispensing said composition, said herbicidal composition comprising a homogeneous liquid phase having dissolved therein about ¼ to 10% by weight of a aryloxyacetic acid herbicide and about ¼ to 10% by weight of an organic marking compound which is normally solid at 40° C. and selected from the group consisting of higher fatty acids having 12 to 22 carbon atoms, higher fatty acid esters of lower aliphatic alcohols having 12 to 22 carbon atoms in the fatty acid radical, and lower alkyl ethers of cellulose, and about 5 to 95% by weight of a volatile co-solvent selected from the group consisting of ethanol, isopropyl alcohol, acetone, methylene chloride and methyl chloroform said spray resulting in solidification of said organic marking compound to a visible solid film upon application of the herbicide to the weeds.

References Cited in the file of this patent

UNITED STATES PATENTS

| | | |
|---|---|---|
| 2,390,941 | Jones | Dec. 11, 1945 |
| 2,524,590 | Boe | Oct. 3, 1950 |
| 2,659,704 | Kerr | Nov. 17, 1953 |
| 2,716,637 | Bunting | Aug. 30, 1955 |
| 2,736,991 | Shumacher et al. | Mar. 6, 1956 |

OTHER REFERENCES

"Agricultural News Letter," Dupont, May–June 1955, page 47.

UNITED STATES PATENT OFFICE

CERTIFICATE OF CORRECTION

Patent No. 3,037,854　　　　　　　　　　　　　　June 5, 1962

Edward Joseph Kenney et al.

It is hereby certified that error appears in the above numbered patent requiring correction and that the said Letters Patent should read as corrected below.

Column 2, line 39, for "weels" read -- weeds --; column 3, lines 5 and 6, after "desired" strike out -- propellant solvent system to provide a product having the desired --.

Signed and sealed this 26th day of February 1963.

(SEAL)
Attest:

ESTON G. JOHNSON
Attesting Officer

DAVID L. LADD
Commissioner of Patents